July 10, 1951    J. GEISSELER    2,560,282
DEVICE FOR AUTOMATIC REGULATION OF ROOM
TEMPERATURE IN BUILDINGS
Filed March 24, 1947    2 Sheets-Sheet 1
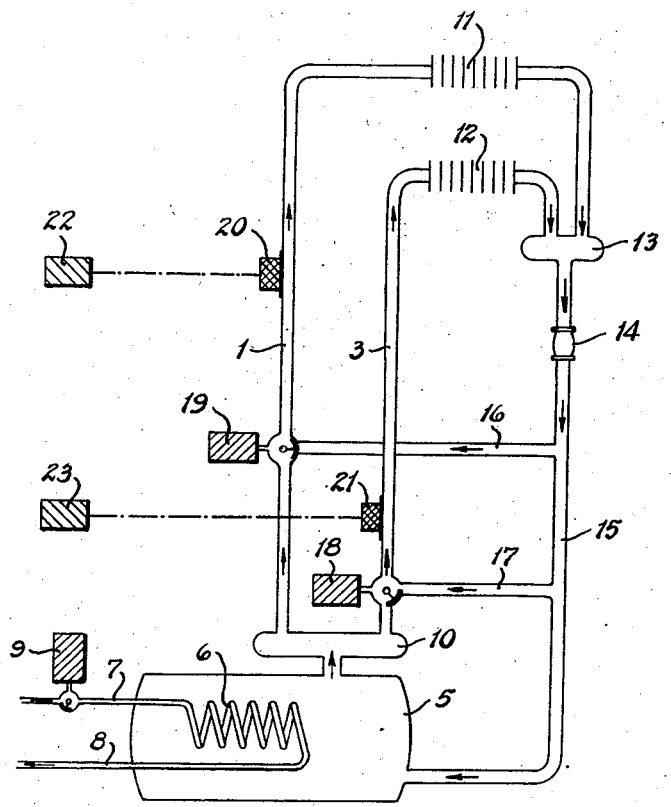
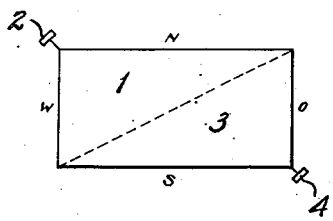
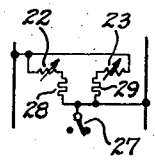
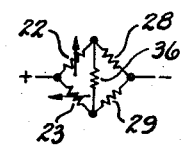
INVENTOR
Josef Geisseler
BY
Morgan, Finnegan + Durham
ATTORNEYS

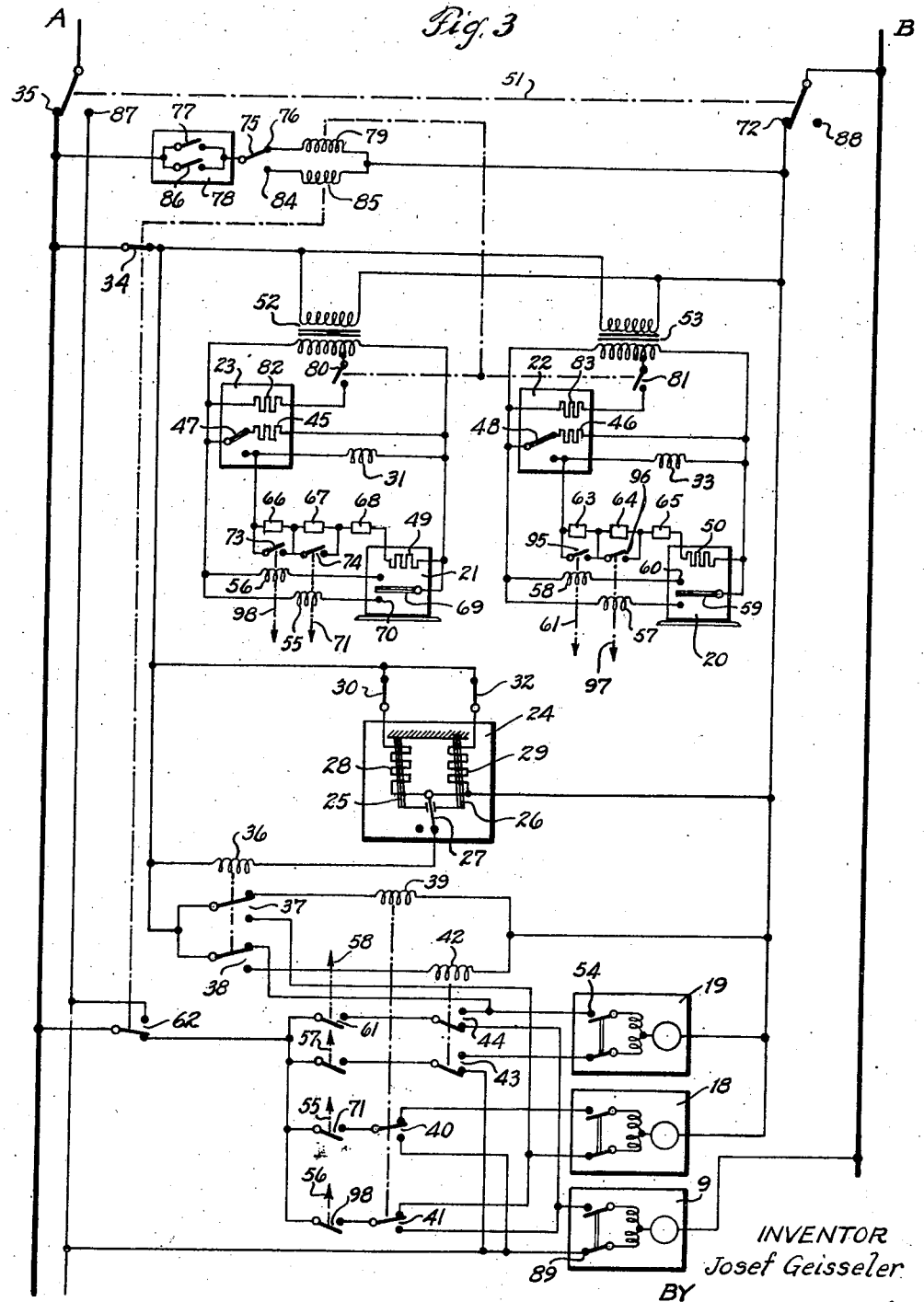

Patented July 10, 1951

2,560,282

UNITED STATES PATENT OFFICE 2,560,282

DEVICE FOR AUTOMATIC REGULATION OF ROOM TEMPERATURE IN BUILDINGS

Josef Geisseler, Thalwil, Switzerland, assignor to Landis & Gyr, A-G., a corporation of Switzerland Application March 24, 1947, Serial No. 736,845

1 Claim. (Cl. 237—8)

The present invention relates to heating arrangements with automatic regulation of the temperature of the interior of buildings and more especially to a regulating installation of the kind mentioned with at least two heating circuits that are to be regulated separately. Each circuit is to be regulated according to the weather conditions affecting the part of the building that corresponds to it. This application is a continuation in part of my copending application Serial Number 473,603 filed January 26, 1943, and now abandoned.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The invention consists essentially in that an outside thermostat and a contact thermostat (i. e., a thermostat directly established in a pipe line and reacting to the temperature of the medium flowing through the pipe line) are associated with each heating circuit, and the source of the heat of the heating installation is controlled automatically by the contact thermostat whose outside thermostat requires most heat of all the outside thermostats.

Of the drawings:

Fig. 1 is a diagram representing a building divided as indicated by the diagonal dotted line into two of many possible zones, hereinafter termed the northwest zone I and the southeast zone 3, and showing the arrangement of the outdoor thermostats therein;

Fig. 2 is a diagrammatic showing of a heating installation for the building and zones depicted in Fig. 1;

Fig. 3 is a diagrammatic showing of a control system for the installation shown in Fig. 2; and Figs. 4 and 5 are diagrammatic showings of details of modified embodiments of the control system shown in Fig. 3.

One object of the invention is to provide a heat supplying and controlling system for the various zones of a building to be conditioned which embodies means for supplying either high temperature heating fluid or a lower temperature heating fluid composed of mixed high and low temperature fluid to the zones to maintain a desired temperature or temperatures in the zones.

A further object of the invention is to provide a system of this character wherein the low temperature fluid consists of spent or exhaust fluid from which a portion of the heat has been abstracted in the radiators or other heat exchangers or heating units of the system.

A still further object of the invention is to provide a system of this character which embodies outdoor thermostats (heat-loss meters), one associated with each zone, operating in accordance with heat-losses, due not only to outside temperature conditions, but also to variations in the strength of the wind, solar irradiation, atomspheric moisture, etc., for controlling heat supplying elements associated with the respective zones in such manner as to supply high temperature fluid to that zone associated with the outdoor thermostat demanding the most heat and to supply lower temperature fluid to the other zone or zones, while generally regulating and controlling the supply of heating fluid at suitable temperatures to the respective zones to maintain desired temperature conditions therein.

A still further object of the invention is to provide novel means governing the supply of high and low temperature heating fluid to the respective zones and controlled by the outdoor thermostats through differential regulating means governed thereby, whereby each zone will be supplied with more or less heating fluid at proper temperatures to maintain desired temperature conditions in the respective zones.

The invention comprises a heating and automatic regulating plant in which the heat regulation is carried out not according to room temperatures but independently of the cooling factors of the building to be warmed, that is to say, in accordance with its heat-losses, which depend not only on the outside temperature but also to a great extent on the strength of the wind, on solar irradiation, atmospheric moisture, etc.

The regulating plant operates in accordance with this principle in such a way that a motor valve governing the supply or temperature of a high temperature heating fluid and thermostatically controlled motor valves governing the supply of high or low temperature fluid to heat exchangers are differentially controlled by regulating means including flow pipe contact thermostats influenced by outdoor thermostats arranged outside the building and depending for their actions on weather conditions. The controlling and regulating actions are electrically so performed that the temperature of the heating medium supplied to the heat exchangers in the zones is always directly proportional to the heat-losses of the building, i. e., higher with severe cooling and lower with slight cooling with respect to a predetermined atmospheric temperature.

In Fig. 1, the external thermostat 2 corresponds to the northwestern circuit 1 and the external thermostat 4 to the southeastern circuit 3.

According to the example of the heating installation shown in Fig. 2 the two zone heating circuits 1 and 3 are supplied from a source of heat formed by a heat exchanger 5 (hot water or steam). The heat exchanger has on the primary side a heating coil 6, with a flow pipe 7 and a return pipe 8. In the flow pipe 7, the motor operated valve 9 controlling the source of heat 5 is arranged. The northwestern circuit 1 and the southeastern circuit 3 lead on the secondary side of the heat exchanger 5, through the flow header 10 to the appropriately connected heating bodies or radiators 11 and 12 of the building. Both of them open into the return header 13. From there the return flows through the rotary pump 14 to the heat exchanger 5. From the return 15 two mixing passages branch off, of which passage 16 leads to the northwestern circuit 1, and mixing passage 17 to the southeastern circuit 3. The motor operated valves 18 and 19 are arranged at the entrance of the two mixing passages into the corresponding circuits. The motor operated valves 18 and 19, as well as 9 already mentioned, may be any conventional and suitable motor driven shutting-off members for steam or water lines. By changing the direction of rotation of the motor in such valves they may be opened or closed, and terminal switches controlled by the shutting-off member interrupts the motor in the entirely open or entirely closed position of the valve. To the flow pipe of circuit 1 the contact thermostat 20 is applied, and to the flow pipe of circuit 3 the contact thermostat 21. The thermostats 20 and 21 are any conventional contact thermostats established directly in a pipe line and reacting to the temperature of the medium flowing through the line. The contact thermostat 20 is electrically connected to the heating circuit of an outside thermostat 22 (see Fig. 3) for circuit 1, and the contact thermostat 21 to the heating circuit of the outside thermostat 23 for the circuit 3. The two outside thermostats 22 and 23 are connected to a thermal differential relay 24 in the manner set forth hereinafter. The thermal differential relay has two bimetal strips 25, 26 acting in opposition to each other and fixed at one end, and mechanically coupled at the other end by means of a link. This coupling member actuates the switch 27. The two bimetal strips are each provided with a heating winding 28, 29 respectively. The heating windings are connected across the network A, B through the contactors 34, 35 and 72 and in the case of the heating winding 28 through the contactor 30 of the impulse relay 31, and in the case of the heating winding 29 through the contactor 32 of the impulse relay 33. The switch 27 of the differential relay 24 has a stationary contact and a movable contact made from material with springlike qualities such that the movable contact moves with a snap action into and out of engagement with the stationary contact. A relay 36 having double-throw switches 37 and 38 associated with it is connected to the stationary contact of the switch 27, the switches 37 and 38 being respectively connected in one of their positions to the change-over relays 39 and 42. The relay 39 acts upon the contacts 40 and 41, while the relay 42 acts upon the contacts 43 and 44. From the contacts 40 and 41 there leads on the one hand a line to the mixing valve 18 of the circuit 3, on the other hand to the straightway valve 9 on the primary side of the heat exchanger. Likewise, the contacts 43, 44 are correspondingly connected to the mixing valve 19 for the circuit 1 and to the straight-way valve 9.

The interconnections of the remaining elements shown in Fig. 3 follow from the mode of operation of the installation described hereinafter.

In order to keep the heat losses small, and to be independent of the angle of incidence of sun and wind, the valve 9 on the primary side of the heat exchanger 5 is controlled by the contact thermostate 20, 21, which is associated with that one of the outside thermostats 22, 23 requiring more heat, which is to say that the primary side of the heat exchanger 5 is so controlled that its generation of heat covers the heat required by that half of the building which needs more heat. The other half of the building is regulated by admixture. As, moreover, the heat required by the halves of the building varies according to the time of the day and the weather, a mixing valve 18, 19 is provided for the flow pipe of each circuit 1, 3 in the present embodiment.

The two outside thermostats 22 and 23 produce current impulses dependent on the weather, the thermostat requiring the most heat being connected the longer time to its auxiliary heating winding 45 or 46. During those intervals in which the auxiliary heating windings 45 and 46 do not have current flowing therethrough, the switches 47 and 48 are connected to the relays 31 and 33, respectively. Associated with the relays 31 and 33, respectively, are the contacts 30 and 32, respectively, which are opened when current flows through the relays. When either or both of the contacts 30 and 32 are closed, current flows from the power lead A through the contacts 35 and 34 to the contacts 30 or/and 32 and then through the windings 28 or/and 29 to the contact 72 and the power lead B. As may be seen, the windings 28 and 29 are each heated for a time dependent upon the heat requirements of their respective outside thermostats and the winding heated for the longer period of time will determine the position of the switch 27.

The cooperation of the outside thermostats 22 and 23 with the proper contact thermostat 20 or 21 in connection with the regulating member is as follows:

The outside thermostats or heat loss meters 22, 23 represent substantially small copies of the heated building, as they consist of a chamber in which are found auxiliary electric heating means 46 and 45 respectively and elements responsive to temperature, e. g., bimetal contactors 48 and 47. In conformity with its adjustment the element responsive to temperature maintains in the chamber the same temperature as that desired in the building, by switching the auxiliary electric heating arrangement on and off. However, atmospheric conditions exert an influence on the loss of heat of this chamber as they do on that of the building. The greater this loss of heat the longer must be the period for which the auxiliary electric heating system must remain connected to the heat responsive device, in order to hold the temperature of the chamber at the desired value.

These outside thermostats control by means of their contacts 47 and 48 a heat resistance 49 or 50 in corresponding contact thermostats 21 or 20, in such a manner that the heating windings of the contact thermostats are always switched on when the auxiliary heating system of the outside thermostats is switched off. In this manner the contact thermostats receive a moderate amount of heat which is inversely proportional to the loss of heat in the outside thermostats. The greater the latter, so much less are the contact thermostats heated.

The contact thermostats 20, 21 are influenced both by the temperature of the flow pipes and by their heating resistance 49 or 50 (by impulses of the outside thermostats 22, 23). The effect of this is that the flow pipe temperature must be so much higher the briefer the switched-on periods of the heating resistances 49 or 50 and the greater the heat losses are in the outside thermostats, in order that the contact thermostats 22 or 23 will switch on or over. The contact thermostats now impart in their turn to the corresponding actuating members of the heating system of the building (in the case in question, to the valves 9 or 18 and 19) such impulses that the resulting position of the valve always corresponds to the loss of heat of the outside thermostat 23 or 22. The loss of heat of the outside thermostat being a measure of the loss of heat of the building itself the heat supply of the heating system of the building is so influenced as to vary with the loss of heat of the building. This enables us to attain a uniform temperature in the interior of the building with all cooling conditions to be met in practice.

In order to explain in detail the mode of operation of the present example let it be assumed that at the point of time in question the northwestern circuit 1 requires more heat than before while the heat requirement of the southeastern circuit 3 remains the same.

When the line switch 51 is closed the outside thermostats 23, 22 are switched on in the known manner through the feed transformers 52, 53. By means of their contacts 47, 48 which are sensitive to temperature, both outside thermostats send out impulses according to a scheme in which the ratio of switched-on plus switched-off time to the switched-on time is all the greater the more strongly the thermostat is cooled. Let the switched-on position of the contacts 47 or 48 be such that the contacts are thrown downwards (Fig. 3). Therefore the contacts in question, 47 or 48, thus energize relays 31, 33 which closes their contacts 30 and 32 so as to make the circuit between A and B through the heating windings 28, 29 of the differential relay 24. As according to the above assumption the outside thermostat 22 corresponding to circuit 1 requires more heat than the thermostat 23 for circuit 3, the heating winding 29 has on account of the longer switched-on impulse caused the contact 27 on its side to tilt (Fig. 3) whereby the change-over relay 36 is energized and closes, by means of its contact 37, the circuit to the change-over relay 39, interrupting however the circuit to the change-over relay 42 by means of its contact 38, putting in addition electric pressure on the "Open" terminal of the mixing valve 19, whereby the latter moves in the opening position in which the flow of the circuit 1 is released and the admixing pipe 16 is closed. The actuation of the motor valve 19, as well as the motor valves 9 and 18, may be readily understood if one considers that the switches built into these arrangements are mechanically controlled toward the end of the open and closed movement in such a manner as always to be made ready for the contrary movement. The change-over relay having been energized the admixing valve 18 is now controlled through the relays 55, 56 by means of the contact thermostat 21, while on account of the drop of the change-over relay 42 the regulating valve 9 is controlled through the relays 57, 58 by the contact thermostat 20. Thus by controlling the valve 9 the contact thermostat 20 causes the necessary heat to be supplied to the heat exchanger 5 and therefore to the circuit 1, while the contact thermostat 21 of the circuit 3, which is connected to the valve 18, controls the latter for purposes of admixture through the passage 17.

Said control of valve 9 by the thermostat 20 on the one hand and of valve 18 by the thermostat 21 on the other hand is accomplished as follows:

The switch 27 has interrupted the circuit to the relay 42 through the contacts 37, 38 of the relay 36 and changed its contacts 43, 44 to the connection with the valve 9. The contact thermostat 20 changes its contact 59 to 60 ("Cold" terminal, as circuit 1 requires heat) so that the relay 58 responds and closes its contacts 61 and 95. This closes the circuit A, 35, contacts 62, 61, 44, "On" terminal of valve 9, B. The valve is opened until contact 59 returns to its midposition, thereby interrupting again the above mentioned circuit through the relay 58 causing the valve 9 to stop in some intermediate position. This event is repeated if necessary several times in consequence of the series resistances 63, 64, 65 being short-circuited or connected in by the excited relays 58 or 57 through the contact 95 or 96, which causes the heating winding 50 in the thermostat 20 to give off more or less heat whereby the middle contact 59 is returned thermally.

As regards the switching of the contact thermostat 21 to the valve 18, which takes place almost simultaneously with the above events, it should be mentioned that the change-over relay 24, and therefore also 39 are energized by the switch 27, so that the contacts 40 and 41 are connected to the valve 18. In the contact thermostat 21 the bimetal contact 69 engages 70 ("Hot" terminal), whereby the relay 55 reacts, thus closing its contact 71, which closes the circuit through A, 35, contact 62, 71, 40, "Closed" terminal of valve 18, 72, B, the valve 18 thus shutting the flow pipe circuit 3 to a greater extent, by which means the admixing pipe 17 to circuit 3 is opened to a greater extent. On account of the series resistances 66, 67, 68 which are short-circuited or cut in by the energized relays 56 or 55, this event is repeated at intervals until the position of the valve corresponds to the previous heat requirement. The contact 69 is then again in the middle position.

Thus if the outside thermostat 22 for the circuit 1 requires more heat, the corresponding contact thermostat 20 opens the valve 9 to a correspondingly greater extent. At the same time the valve 19 in the flow pipe remains open and closes the mixing pipe 16, whereas the valve 18 in the flow pipe is closed in accordance with the heat requirement and opens correspondingly the connection between the circuit 3 and the mixing pipe 17.

Should the southeastern circuit 3 require more heat, while circuit 1 is to remain the same, the switching operations are correspondingly the reverse.

If both outside thermostats require the same amount of heat, the ratio of the switched-on to the switched-off time being therefore equal, the effect is that on the one hand the contact thermostats 20 and 21 regulate to the same temperature and that on the other hand the two heating windings 28, 29 of the differential relay 24 receive the same average of heat. The contact 27 is so set as to be able to make contact either to the left or right. As it has a snap action which precludes the taking up of a midposition, it can make contact both to the left and to the right, which is however immaterial in the case assumed, as both circuits 1 and 3 are to receive the same amount of heat; hence the valve 9 can be controlled both from 20 and 21.

Experience shows that it is impossible with two separately regulated mixtures to avoid a time at which both valves 18 and 19 are closed, e. g., at the transition from the day to the night schedule, and there would be a danger that the heat exchanger which is also regulated separately might be overheated, as in the case of heat exchangers overheating is liable to occur in a few minutes on account of their small time contacts, with the smallest amount of excess heat relative to heat removal. This risk has been eliminated in the arrangement described above by the positive opening of the valve of the circuit directly supplied from the heat exchanger.

In the diagram of Fig. 3 two night programs are provided for, which can be pre-selected by means of the switch 75.

If switch 75 is at the position 76, the relay 79 is energized on closing the contact 77 of the time switch 78 which serves to connect the night program, by which means the supplementary heating 82, 83 of the outside thermostats 23 and 22 are cut in through contacts 80 and 81. This changes the current impulses delivered to the contact thermostats 21 and 20 in such a manner that the flow of heat through the valves 9 and 18 or 9 and 19 also becomes dependent on the weather, but is smaller than for the same weather during the day. When switch 75 is at the position 84 the relay 85 is energized at night. Said relay interrupts the circuit to the feed transformers 52 and 53 with its contact 34, and the valves 18 and 19 with its contact 62. These remain in the position occupied at the moment while the valve 9 is closed.

Switch 86 of the time switch bridges over the night program switch 77 over the week end, with the result that the heating is reduced or no heating at all provided during the day.

Whereas during the winter, switch 51 (Fig. 3) is always switched on in the position 35, 72 shown, it is changed-over in summer to the contacts 87, 88. This closes circuit A, "Closed" terminal 89 of valve 9, B, whereby the valve in flow pipe 7 is closed.

In place of the thermal differential relay 24, shown in the example of embodiment of Fig. 3, other relays or means may be employed, as for example motors and relays depending on voltage, birotary synchronous motors, etc., which actuate mechanical overtaking gears or variable resistances. The thermal differential relay 24 may also be controlled by the outside thermostats 23, 22 so that the heating windings 28 and 29 of the differential relay 24 receive impulses of the same duration but of different amplitude, in contradistinction to the example of embodiment in which impulses of longer or shorter durations but of the same amplitude are employed. On the other hand, the heating windings 28, 29 can be arranged in the diagonal branches of bridge connections the branches of which contain the two outside thermostats 23 and 22. Of course, in this case there is no question of impulses, but only invariable potentials or invariable resistances. Fig. 4 shows a connection for alternating current which illustrates how each outside thermostat 22 or 23 is connected in series with a heating winding 28 or 29, while Fig. 5 shows a bridge connection for direct current in which the diagonal branch contains the relay 36, which here has the function of the differential relay 24. In this figure, 22 and 23 are again two outside thermostats and 28 and 29 two heating windings.

The valves 9, 18 and 19 need not be motor driven valves, as represented in the drawings, but devices of a different kind may be used for controlling the regulation of the heat supply or removal, such as relays, automatic switch gear, motor driven automatic switch gear, fresh air valves, throttle valves, relays for the automatic firing of furnaces, etc.

The invention in its broader aspects is not limited to the specific mechanisms shown and described but departures may be made therefrom, within the scope of the accompanying claim, without departing from the principles of the invention and without sacrificing its chief advantages.

What I claim is:

In an apparatus for heating and regulating the temperature of a building having a plurality of heating zones, means for supplying a high temperature heating fluid, first valve means in said supply means for controlling the temperature of the fluid supplied thereby, fluid conducting means providing a continuous flow circuit between said supply means and each of said heating zones, by-pass conducting means interconnecting the input conducting means leading into each zone with the conducting means returning the fluid to said supply means, other valve means operative at the injunction of each input conducting means and its by-pass conducting means, cooperating temperature responsive means associated with each zone one external of the associated zone and another in heat-exchange relationship with the fluid conducting means for the associated zone, and circuit means operative by said temperature responsive means to simultaneously adjust said valves so as to supply high temperature fluid to zones below a determined temperature and fluid of lower temperature to zones having the required temperature, said first valve means being under the control of the cooperating temperature responsive means having the external one requiring the greatest amount of heat of all the temperature responsive means.

JOSEF GEISSELER.

REFERENCES CITED

The following references are of record in the file of this patent:

UNITED STATES PATENTS

| Number | Name | Date |
| --- | --- | --- |
| 1,883,243 | Bogle | Oct. 18, 1932 |
| 2,065,835 | Taylor | Dec. 29, 1936 |
| 2,109,649 | Rather | Mar. 1, 1938 |
| 2,153,382 | Martin | Apr. 4, 1939 |
| 2,211,573 | McGrath | Aug. 13, 1940 |
| 2,251,483 | Denison et al. | Aug. 5, 1941 |
| 2,263,422 | Harris | Nov. 18, 1941 |
| 2,323,873 | McGrath | July 6, 1943 |
| 2,345,277 | McGrath | Mar. 28, 1944 |